(12) United States Patent
Wang et al.

(10) Patent No.: US 8,701,270 B2
(45) Date of Patent: Apr. 22, 2014

(54) METHODS OF MANUFACTURING INDUCTION ROTORS WITH CONDUCTOR BARS HAVING HIGH CONDUCTIVITY

(75) Inventors: Qigui Wang, Rochester Hills, MI (US); Mark A. Osborne, Grand Blanc, MI (US); Eugene C. Tuohy, Grand Blanc, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 596 days.

(21) Appl. No.: 12/691,217

(22) Filed: Jan. 21, 2010

(65) Prior Publication Data

US 2011/0175484 A1   Jul. 21, 2011

(51) Int. Cl.
*H02K 15/02*   (2006.01)
(52) U.S. Cl.
USPC .................................. 29/598; 29/596; 164/109
(58) Field of Classification Search
USPC ............ 29/596–598; 310/211; 164/520, 6, 15
See application file for complete search history.

(56) References Cited

U.S. PATENT DOCUMENTS

| | | | |
|---|---|---|---|
| 3,705,971 A * | 12/1972 | Jacovides et al. ........ 219/121.14 |
| 5,429,173 A | 7/1995 | Wang et al. |
| 5,467,521 A * | 11/1995 | Nakamura et al. .............. 29/598 |
| 5,488,984 A * | 2/1996 | Fahy ................................ 164/91 |
| 5,538,067 A * | 7/1996 | Nakamura et al. ............ 164/112 |
| 5,736,707 A * | 4/1998 | Nied et al. ................. 219/117.1 |
| 5,937,930 A * | 8/1999 | Nakamura et al. ............ 164/112 |
| 6,088,906 A | 7/2000 | Hsu et al. |
| 6,453,980 B1 * | 9/2002 | Williams ...................... 164/137 |
| 6,877,210 B2 | 4/2005 | Hsu |
| 7,337,525 B2 * | 3/2008 | Ueda et al. ....................... 29/596 |
| 8,347,485 B2 * | 1/2013 | Biederman et al. ............. 29/598 |
| 8,484,828 B2 * | 7/2013 | Kleber ............................ 29/598 |
| 2010/0243197 A1 * | 9/2010 | Osborne et al. ............... 164/520 |
| 2011/0163627 A1 | 7/2011 | Wang |
| 2011/0174417 A1 | 7/2011 | Oishi |

FOREIGN PATENT DOCUMENTS

CN   101626179 A   1/2010

OTHER PUBLICATIONS

Office Action in U.S. Appl. No. 12/652,911, mailed Jun. 29, 2012 (6 pages).
Xu et al., "Fabrication of aluminum-carbon nanotube composites and their electrical properties," Carbon 37 (1999) 855-858.
Nanotubes 101 Presentation, http://www.cheaptubes.com/carbon-nanotubes-101.htm (available at least as early as May 20, 2010).

(Continued)

*Primary Examiner* — Minh Trinh
(74) *Attorney, Agent, or Firm* — Dinsmore & Shohl LLP

(57) ABSTRACT

Methods of making squirrel cage rotors of aluminum based material end rings joined with high conductive and durable material (such as copper) conductor bars for use in electric motors. The methods include forming conductor bars by casting or other metal forming methods in the slots of laminate steel stack, or positioning the preformed or premade solid conductor bars in the longitudinal slots of the stacked laminated steel, with bar ends extending out of the laminated steel stack ends, optionally coating the extended part of the conductors (bars) with a latent exoergic coating containing Al and one or more conductor bar chemical elements, positioning the laminated steel stack having conductors (bars) in a casting mold that forms the cavity of both end rings of the rotor, filling the end ring cavities with aluminum melt, and allowing the end rings to solidify under pressure. Alternatively, the conductor bars and end rings can be made separately and mechanically joined together.

14 Claims, 7 Drawing Sheets

(56) References Cited

OTHER PUBLICATIONS

Advisory Action dated Feb. 22, 2013 pertaining to U.S. Appl. No. 12/652,911, filed Jan. 6, 2010.

Zong-jian, et al., "Dispersion of Carbon Nanotubes in Aqueous Solution with Glycol", Journal of Guangdong University of Technology, vol. 26 No. 2, Jun. 2009, pp. 43-45—Abstract.

Feng Yan, "BN and carbon nanotube reinforced, wear resistant and friction reduced, aluminum based composite material" (Thesis for M.S.), Zhejiang University, Jan. 1, 2004, pp. 1-57—Abstract.

Final Office Action in U.S. Appl. No. 12/652,911, mailed Nov. 29, 2012.

* cited by examiner

METHODS OF MANUFACTURING INDUCTION ROTORS WITH CONDUCTOR BARS HAVING HIGH CONDUCTIVITY

FIELD OF THE INVENTION

The present invention relates to methods of manufacturing induction rotors for electrical machines and, more particularly, to methodologies and technologies to improve electrical conductivity and rotor durability by using different conductive materials and manufacturing processes between conductor bars and end rings, and to rotors having conductor bars made with high conductive materials.

BACKGROUND OF THE INVENTION

Increasing demands in fuel efficiency have made hybrid systems more attractive in the automotive industry. In addition to a conventional combustion engine, an electric motor is an important part of the hybrid system. To reduce the manufacturing cost of the hybrid system, many of the electric motors used in the hybrid systems are induction motors with cast aluminum or copper squirrel cage rotors. An operating characteristic of these induction motors, known as "slip," is usually proportional to the electric resistance in the rotor, particularly in the conductor bars. A lower resistant rotor produces lower slip and greater efficiency at load-carrying operating points. The electrical resistivities of pure copper and pure aluminum without defects (such as voids, cracks, or oxide inclusions, etc) are 17.1 n$\Omega$m and 26.5 n$\Omega$m, respectively. Consequently, for the same electric current requirement, using a copper rotor can lead to 35.5% reduction in resistance loss in comparison with aluminum rotor ((26.5–17.1)126.5=35.5%).

Because of its high density and melting point, however, copper has limitations and/or unique problems in rotor applications, particularly for hybrid systems. In hybrid applications, a high speed (e.g., more than 10,000 rpm) electric motor is usually needed due to space limitations in automotive vehicles. High density copper can produce very high centrifugal force and inertia at high rpm, and can significantly reduce the durability of the electric motor. Premature damage in rotor bearings is often seen in practice. In addition, copper rotors are usually manufactured by high pressure die casting (HPDC). The high melting point of copper (1083° C.) significantly reduces die life and increases the manufacturing cost of copper rotors.

Although cast aluminum rotors (bars and end rings together) overcome the shortfalls of high rotating inertia and low die life associated with copper material, the low mechanical properties, in particular, the low electric (pure Al: IACS 62%) and thermal conductivity of aluminum alloys, particularly when the cast aluminum conductor bars have casting defects including hot-tear cracks, porosity, and oxide inclusion etc, impose a great challenge for their successful application in electric motors. In addition, the aluminum alloys used to cast rotor squirrel cages are usually high purity aluminum, high purity aluminum casting alloys, or electric grade wrought alloys which are all difficult to cast because of their low fluidity, high shrinkage rate (density change from liquid to solid), high melting temperature, and large freezing range (temperature difference between liquidus and solidus), etc. These characteristics of the higher purity aluminum alloys increase porosity and the tendency of hot tearing, particularly at the locations where the conductor bars connect to the end rings, which leads to fracture between the conductor bars and the end rings. Furthermore, many cast aluminum squirrel rotor cages are made by high pressure die casting process in order to fill the thin and long bars (squirrel slots) in the laminate steel stack quickly to avoid cold shuts. The entrained air and abundant aluminum oxides produced during the high pressure die casting process, which are due to very high flow velocity (about 60 m/s) in mold filling, can not only decrease rotor quality and durability, but also significantly reduce the thermal and electric conductivity of the rotor, particularly in the conductor bars. In practice, it is often seen that the electric conductivity of the cast aluminum rotor (casting conductor bars and casting end rings) is only about 40-45% IACS. Because of the casting defects present in the cast aluminum conductor bars, the bars may be broken during motor operation. The broken bars will further reduce rotor conductivity and motor performance.

Therefore, there is a need for an improved rotor for an electric machine, and for methods of making improved rotors.

SUMMARY OF THE INVENTION

The invention relates to methods of manufacturing induction rotors for electric machines and more particularly, to methods of improving the electric conductivity and durability of rotors by using high conductive and durable conductor bars, such as copper bars, with light weight aluminum end rings. The invention can be applied to alternative current (AC) induction motors as well as other types of electric machines including, but not limited to, direct current (DC) motors.

The method of the invention involves joining the conductor bars of high conductive and durable materials, such as copper bars, with aluminum end rings. When cast-in-place with end rings, the conductor bars are first positioned in respective squirrel slots of the laminate steel stack with both bar ends extending out of opposite ends of the laminated steel stack. The extended portion of the conductor bars may be bent or welded, if desired, to hold and press the laminate steel stack together. The protruded or extended portion of the conductor bars may be coated with Al, Al alloys (e.g. Al-12.6% Si), or a latent exoergic coating containing Al and conductor bar chemical elements such as Cu for the copper bars, to enhance the metallurgical bonding between the conductor bars and the end rings, if desired. Prior to casting the end rings, the laminate steel stack with the conductor bars is positioned in a casting mold that has cavities of both end rings. The end ring material may be pure aluminum, conductor grade aluminum wrought alloys, cast aluminum alloys, or their composites, for example. The end rings may be cast by different casting processes including, but not limited to, high pressure die casting, sand casting, low pressure die casting, squeeze casting, and the like. Squeeze casting is preferred particularly for producing high quality end rings with minimum porosity and oxides.

The conductor bars can be preformed, if desired. They can be made by any metal forming process including, but not limited to, extrusion, forging, casting, powder metallurgy, etc. The conductor bars may be made of copper, silver, their alloys, pure aluminum or aluminum alloy extrusion, high conductive metal matrix composites, etc. Alternatively, they can be formed in the squirrel slots of the laminate steel stack by any suitable process including, but not limited to, casting or powder metallurgy.

In another embodiment, both the conductor bars and the end rings may be made separately with different metal forming processes and then joined together using a mechanical approach such as welding, bolting, and other means.

DETAILED DESCRIPTION OF THE INVENTION

Figure 1:
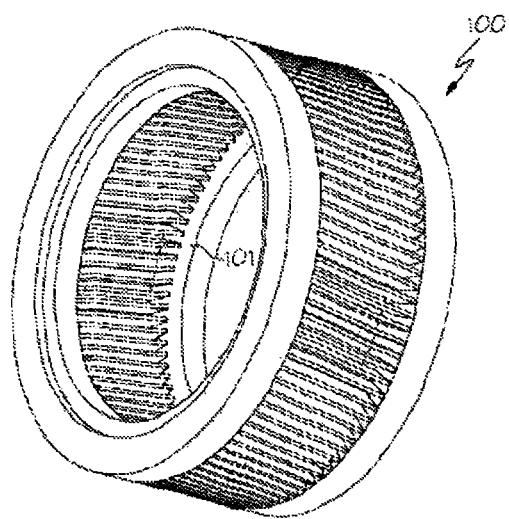
FIG. 1 is an illustration of one embodiment of a squirrel cage rotor.
Figure 2:
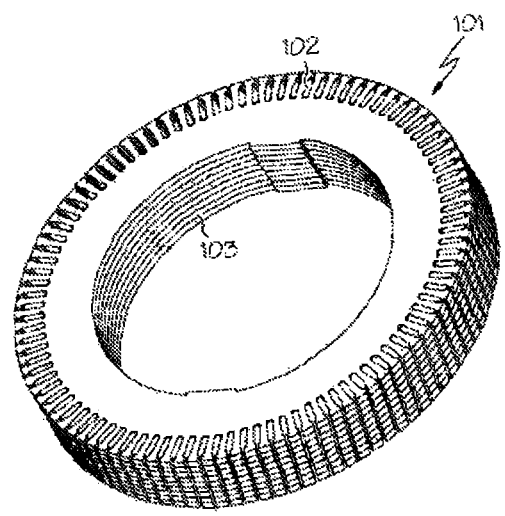
FIG. 2 is an illustration of one embodiment of a stack of laminated steel.

A squirrel cage rotor is a cylinder that is mounted on a shaft rotating in an induction motor. It contains longitudinal conductor bars set into squirrel slots and connected together at both ends by short rings forming a cage-like shape. FIG. 1 shows an illustration of one embodiment of a squirrel cage rotor 100. The core of the rotor 100 is built with stacks of electrical steel laminations. FIG. 2 shows an illustration of one embodiment of a stack 101 of laminate steel 103.

The field windings in the stator of an induction motor set up a rotating magnetic field around the rotor. The relative motion between this field and the rotation of the rotor induces electric current in the conductor bars. In turn these currents lengthwise in the conductors react with the magnetic field of the motor to produce force acting at a tangent to the rotor, resulting in torque to turn the shaft and the rotor. In effect, the rotor is carried around with the magnetic field, but at a slightly slower rate of rotation. The difference in speed is called slip, and it increases with load.

Figure 3:
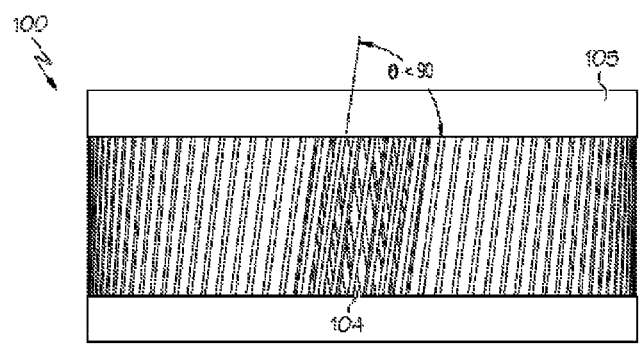
FIG. 3 is an illustration of one embodiment of the conductor bars and the end rings.

The conductor bars 104 are often skewed slightly along the length of the rotor (i.e., the conductor bars 104 are not perpendicular to the plane of the end ring 105 where the end ring 105 attaches to the conductor bars 104) to reduce noise and to smooth out torque fluctuations that might result in some speed variations due to interactions with the pole pieces of the stator, as shown in FIG. 3. The number of bars 104 on the squirrel cage 100 determines to what extent the induced currents are fed back to the stator coils and hence the current through them. The constructions that offer the least feedback employ prime numbers of bars 104.

The iron core (laminate steel stack) 101 serves to carry the magnetic field across the motor. The structure and materials for the iron core 101 are specifically designed to minimize magnetic losses. The thin laminations (steel sheets) 103 (shown for illustration purposes only), separated by varnish insulation, reduce stray circulating currents that would result in eddy current loss. The material for the laminations 103 is a low carbon, high silicon steel with several times the electrical resistivity of pure iron, further reducing eddy-current loss. The low carbon content makes it a magnetically soft material with low hysteresis loss.

The same basic design is used for both single-phase and three-phase motors over a wide range of sizes. Rotors for three-phase motors will have variations in the depth and shape of bars to suit the design classification.

Figure 4:
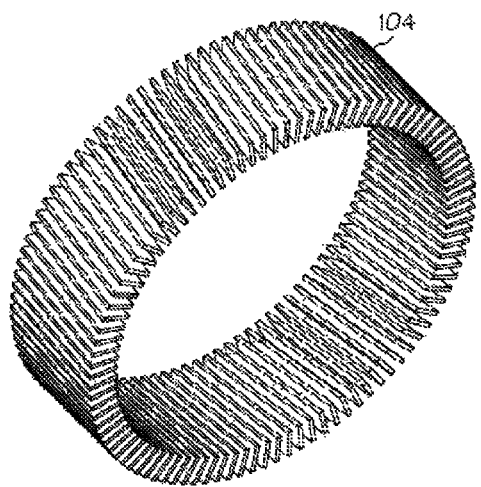
FIG. 4 is an illustration of one embodiment of a bar structure in a squirrel cage rotor.
Figure 5A:
FIGS. 5A-H are illustrations of different embodiments of bar cross section shapes.
Figure 5B:
Figure 5C:
Figure 5D:
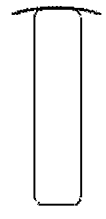
Figure 5E:
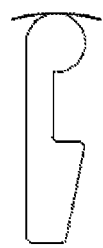
Figure 5F:
Figure 5G:
Figure 5H:
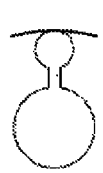

FIG. 4 shows an example of the bar structure 104 in a squirrel cage rotor 100. The cross section of the bars 104 is usually uniform in the longitudinal direction, but the shape and size varies with bar materials and particularly with specific motor design. FIG. 5 illustrates examples of different bar 104 shapes.

Squirrel rotor cages can be made by joining, mechanically or by casting-in-place, conductor bars made of a high conductive and durable material with inexpensive and light aluminum, aluminum alloys, or aluminum composite end rings. The conductor bars are generally made of a different material from the end rings (both end rings would typically be made of the same material). As used herein, aluminum is a different material from aluminum alloys and/or aluminum composites.

Suitable high conductive and durable materials for conductor bars include, but are not limited to, copper, silver, or their alloys; pure aluminum or aluminum alloy extrusion, high conductive metal matrix composites containing conductive particles, fibers, or tubes. As used herein, the metal matrix composites contain more than about 50 vol % of a metal and less than about 50 vol % of the conductive particles, fibers, or tubes. A high conductive and durable material used for the conductor bars should have conductivity greater than that of cast pure aluminum and have mechanical properties better than those of heat-treated cast aluminum alloys. For example, extruded pure aluminum conductor bars have higher conductivity than cast pure aluminum bars due to unavoidable casting defects in the casting bars.

The conductor bars 104 may be formed in the longitudinal slots 102 in the laminate steel stack 101, if desired. Suitable manufacturing processes include, but are not limited to, casting and powder metallurgy (PM). If a casting process is used and the slots 102 in the laminate steel stack 102 are open ones, as shown in FIG. 2, liquid metal or semi-solid slurry or sub-liquid slurry of the conductor bar material can be introduced from the bar's longitudinal openings using a squeeze casting method with a mold having one ingate which is similar to the geometry of a bar slot opening. The bars can be made one at a time, and the laminate steel stack inside the mold can then be rotated to make next one. If the slots in the laminate steel stack are closed ones, the liquid metal of the conductor bar material can be introduced from the ends of the slots. All of the bars can be filled at the same time with one bar one ingate, or all the bars could be connected to one common small end ring ingate. The width of the ingate ring (in the radial direction) is preferably at least equal to the maximum dimension of the conductor bar cross section.

With the PM technique or process, the slots are filled with powders of the conductor bar materials including, but not limited to copper, silver, or other materials, pure aluminum, aluminum alloy, high conductive metal matrix composites, etc. and then pressed to reduce voids. After sintering, the bars may be further pressed with hot-isostatic-pressing (HIPing) to reduce porosity and also to break the connection between the bars and the laminate steel stack. The hot-isostatic-pressing process helps to ensure that the conductor bars are defect free.

One challenge associated with making the bars in the laminate steel slots is that the length of the bars to be made will be limited by the length (height) of the laminate steel stack. It may be difficult and expensive in terms of mold/die design and manufacturing process complexity to get both bar ends extending out of the laminate steel stack. One possible solution is to place conductive and durable wires in each slot, and then fill the slots with liquid metal or powders. The wires would then be part of the conductor bars and would extend to the end rings.

Alternatively, the conductor bars can be preformed without using the laminate steel stack. The preformed conductor bars may be made by various manufacturing processes including, but not limited to, forging, extrusion, casting, powder metallurgy, etc. One preferred method is extrusion. The liquid bar material is cast into ingots or large bars with different possible shapes and dimensions. The ingots/bars are then extruded at one or more stages to form the final shape and dimension with the cross section slightly smaller (about 10 to about 50 μm) than the cross section of the slots in the laminate steel stack. Another preferred method is casting, in particular continuous casting. The liquid metal is cast directly into bars which have the same shape and dimensions as the slot cross section in the laminate steel stack using a continuous casting process. The long casting bars are preferably subject to a hot-isostatic-pressing process to eliminate any possible casting porosity prior to cutting to the appropriate conductor bar length.

Using preformed conductor bars not only enables the use of a high conductive and durable material, but also the ability to make defect-free bars. In general, forging and extrusion methods can easily remove any porosity in the conductor bars.

Using preformed conductor bars made of a high conductive and durable material together with light and inexpensive aluminum end rings can not only improve motor performance, but also reduce manufacturing cost. To achieve the same motor performance as a copper rotor, an aluminum end ring would require at least a 55% larger cross sectional area than a copper one due to its lower conductivity (about 62% IACS). However, because the density of copper is 3.29 times that of aluminum, the weight of the larger aluminum end ring would be only 47% that of a copper ring. In general, the price of copper is at least 20% higher than aluminum. Consequently, an aluminum end ring is estimated to cost about 60% less than its copper equivalent.

Figure 6:
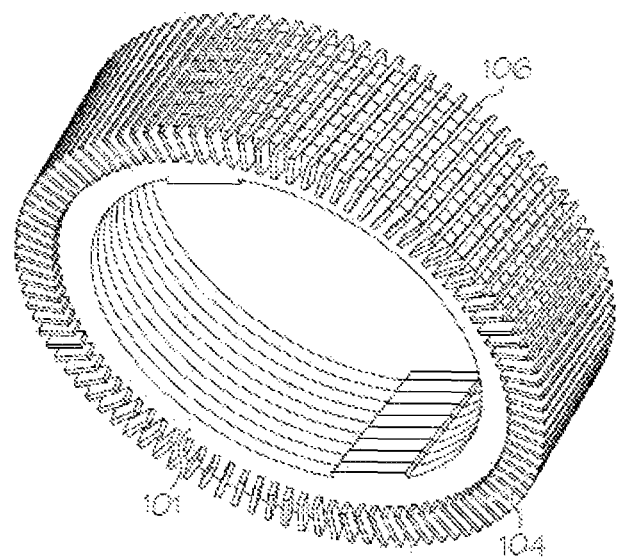
FIG. 6 is an illustration showing one embodiment of conductor bars extending out of the ends of a laminated steel stack.

The extended portion 106 of the conductor bars 104 may be straight (as shown in FIG. 6), bent, or even welded together prior to casting-in-place with the end rings 105. Bending or welding the bar ends can be utilized to lock the laminated steel stack. To reduce the air gap and iron loss between the thin laminated steel sheets (about 0.3 mm thick), it is desired to keep the laminate steel stack as tight as possible. In practice, the laminate steel stack is usually held together using point welding or an inter-lock mechanism. In either case, the iron loss can be increased due to the local current connection between the electrically insulated laminate steel sheets.

It is desired to have metallurgical bonding to reduce the electric resistance between the conductor bars and the cast aluminum end rings. This can be achieved by coating the bar ends, which extend out of the laminate steel stack, with aluminum or aluminum alloys such as Al-12.6% Si. The preferred choice would be a latent exoergic coating containing Al and conductor bar chemical elements such as Cu, Al or others. The latent exoergic coating desirably contains at least one of the chemical elements contained in the conductor bars. Latent exoergic coating is described in U.S. Pat. No. 5,429,173 by Wang et al., which is incorporated herein by reference.

If the conductor bars are preformed prior to casting-in-place with the end rings, it becomes much easier to cast the simple shape end rings with a high probability of achieving good quality in the end rings. Therefore, the casting of the two end rings with the preformed bars can be made by a variety of casting processes, including, but not limited to, high pressure die casting, sand casting, low pressure die casting, centrifugal casting, lost foam, squeeze casting, semi-solid casting, investment casting, etc. Among these processes, squeeze casting of semi-solid slurry is particularly preferred for producing high quality end rings with minimum porosity and oxides.

Because of the relatively simple shape of the end rings, the aluminum material to be cast can be any kind of aluminum alloys including conductor grade aluminum wrought alloys, cast aluminum alloys, aluminum based composites, or even pure aluminum without concern for hot tearing and shrinkage because the thin and long conductor bars have been already premade.

Figure 7:
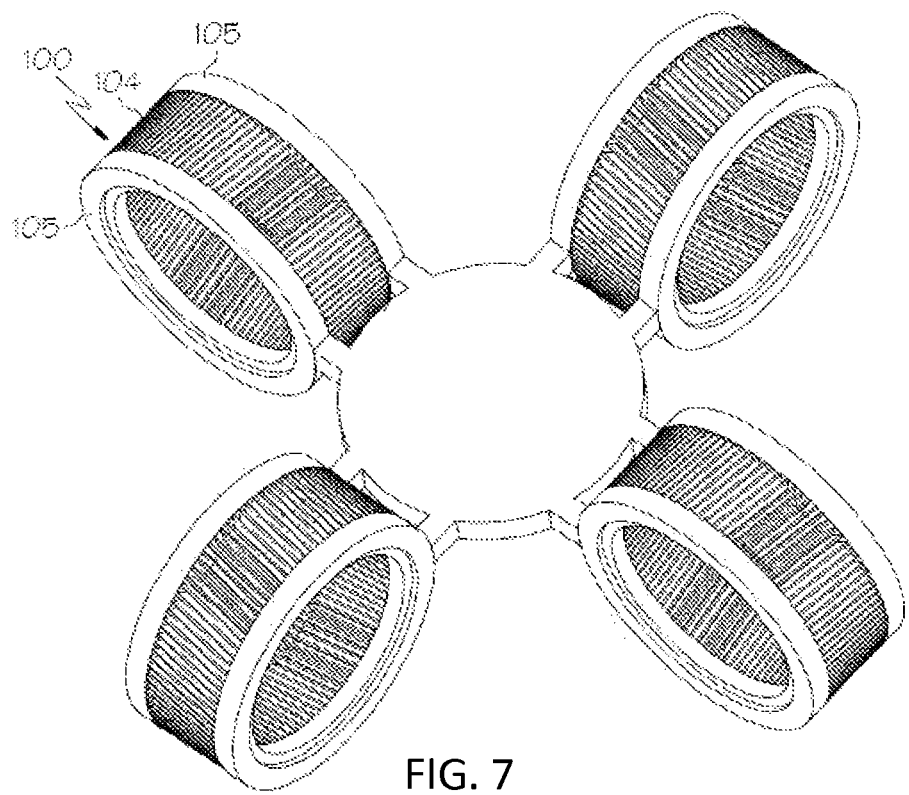
FIG. 7 is an illustration of 4 rotors made in a single shot HPDC process.

FIG. 7 is an illustration of cast aluminum rotors made in a vertical high pressure die casting. In the example, multiple rotors can be cast in a single mold and HPDC shot. Compared with the conventional method of manufacturing one squirrel rotor cage per mold, this can not only increase productivity, but also improve the casting quality significantly. Table 1 shows the quality improvement with one embodiment of the disclosed methods in this invention. With the preformed conductor bars, the defects associated with casting process and aluminum alloys in the conductor bars are eliminated and the defects in the casting end rings are also reduced dramatically with the high pressure die casting (HPDC) process and are fully eliminated with the squeeze casting process of semi-solid aluminum slurry.

TABLE 1

A comparison of casting quality of induction rotors made by different manufacturing methods.

| | Casting Defects | | | | | |
|---|---|---|---|---|---|---|
| | Oxides (cm$^2$) | | Entrained Air Volume (cm$^3$) | | Equivalent Circle Diameter (ECD) of the Largest Entrained Air Bubble (um) | |
| Manufacturing Methods | Bars | End Rings | Bars | End Rings | Bars | End Rings |
| HPDC of whole squirrel cage including bars and end rings | 251 | 1199 | 3.65 | 16.8 | 208 | 685 |
| HPDC of end rings with the preformed bars | 0 | 111 | 0 | 2.3 | 0 | 48 |
| Squeeze casting of end rings using semi-solid aluminum slurry | 0 | 0 | 0 | 0 | 0 | 0 |

The reduced defects in the preformed conductor bars can improve not only the durability of the conductor bars, but also the whole rotor squirrel cage, particularly at the locations where the conductor bars connect the end rings. Extending a portion of the bar ends into the end rings further improves the shear resistance of the materials at the location where the bars connect to the end rings and where the shear stress is also the highest during electric motor operation.

In addition to casting-in-place the preformed conductor bars with the end rings mentioned above, another manufacturing approach is to make the conductor bars and end rings separately and then join or fasten them together mechanically.

Mechanical joining or fastening can be accomplished through approaches including, but not limited to, welding, brazing and soldering, gluing, bolting, screwing, riveting, etc. The same materials can be used in this process as in the cast-in-place method. If mechanical joining or fastening methods are used, the ends of the conductor bars do not need to be coated, and no special treatment is needed.

Examples of suitable methods of joining the conductor bars and the end rings include, but are not limited to the following. The conductor bar ends may extend few of millimeters out of laminate steel stack in both directions and may be welded to the solid end rings using friction welding. In friction welding, the conductor bars and the laminate steel are stationary, but the end rings rotate at high speed and are pushed against the ends of the conductor bars. The friction between the ends of the conductor bars and the end rings produces heat to melt the conductor bars and end rings locally and join them together. The friction welding process is well known, and the friction welding process parameters vary with the materials, sizes, and geometry of the conductor bars and the end rings. Another example is to extend the ends of the conductor bars through holes in the end rings and weld them to the end rings using laser welding, arc welding, stir welding, or similar processes. The length of the conductor bar end extension is close to the thickness of the end ring. In stir welding, the connection portion between the end rings and the conductor bars can be locally melted using a rotating bit. Still another example is to extend the conductor bar ends through and out of the end rings, and bend the conductor bars onto both ends of the end rings. The bent portion of the conductor bar ends can be bolted individually to the end rings or using washers which have the same inner diameter (ID) and outer diameter (OD) as the end rings. The bolt and washer materials are preferably pure Al or Cu.

Figure 8:
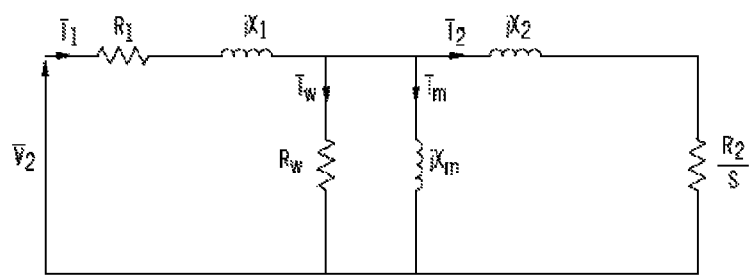
FIG. 8 is an illustration of an equivalent circuit of a three-phase induction motor.

The equivalent circuit of an induction motor is like a transformer with the stator being the primary and the rotor the secondary, as shown in FIG. 8. The rotor resistance can be evaluated by conducting a DC test, a locked rotor test, and an open-rotor-cage (no-load) test.

The DC test can be used to determine stator electric resistance ($R_1$). The DC resistance of the stator can be measured by applying a DC current to the terminals of the winding of each phase and taking the reading of the voltage and the current (or using ohmmeter) and determining the DC resistance as follows:

$$R_{iDC} = \frac{V_{iDC}}{I_{iDC}} \tag{1}$$

where i represents the number of the winding (i=1, 2, 3).

After that, the average of the readings can be calculated as:

$$R_{DC} = \frac{R_{1DC} + R_{2DC} = R_{3DC}}{3} \tag{2}$$

Then, the AC resistance is given by:

$$R_1 = 1.15 R_{DC} \tag{3}$$

Figure 9:
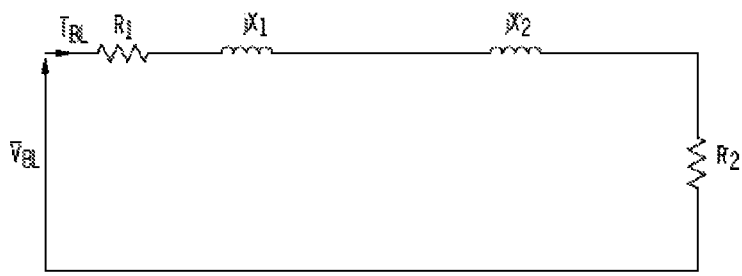
FIG. 9 is an illustration of an approximate equivalent circuit for locked rotor conditions.

When the rotor is locked (i.e., prevented from running), there is no rotation slip, and s is equal to 1. The secondary (rotor) impedance becomes much less than the magnetizing branch, and the corresponding equivalent circuit can be simplified as that of FIG. 9. The readings to be obtained from this test are:

a) Three phase power $P_{3\phi\_BL}$
b) Line voltage $V_{L\_BL}$
c) Line current $I_{BL}$ From these readings, the per phase values of the power $P_{BL}$ and phase voltage $V_{BL}$ can be obtained as follows:

$$P_{BL} = \frac{P_{3\emptyset\_BL}}{3} \tag{4}$$

$$V_{BL} = \frac{V_{L\_BL}}{\sqrt{3}} \tag{5}$$

Then, $R_2$, $Z_{eq}$, and $X_{eq}$ can be obtained using the following equations:

$$\cos(\emptyset_{BL}) = \frac{P_{BL}}{V_{BL}I_{BL}} \tag{6}$$

$$\sin(\emptyset_{BL}) = \sqrt{1 - \left(\frac{P_{BL}}{V_{BL}I_{BL}}\right)^2} \tag{7}$$

$$Z_{eq} = \frac{V_{BL}}{I_{BL}} \tag{8}$$

$$R'_2 = Z_{eq}\cos(\emptyset_{BL}) - R_1 \tag{9}$$

$$X_{eq} = Z_{eq}\sin(\emptyset_{BL}) \tag{10}$$

$$X_1 = X'_2 = \frac{1}{2}X_{eq} \tag{11}$$

Figure 10:
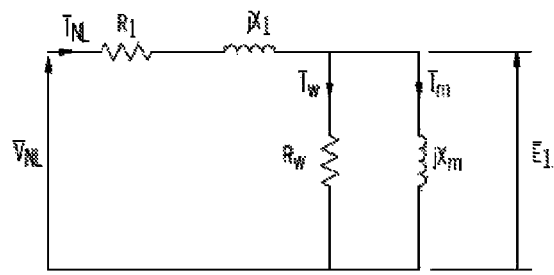
FIG. 10 is an illustration of an approximate equivalent circuit for no load conditions.

When the induction motor runs at no load, the rotor speed approaches the synchronous speed. The slip becomes very small in this case. Accordingly, the secondary impedance becomes high compared with the magnetizing branch. The equivalent circuit can be approximated by that of FIG. 10. The readings to be obtained from this test are:

a) Three phase power $P_{3\phi\_NL}$
b) Line voltage $V_{L\_NL}$
c) Line current $I_{NL}$ From these readings, the per phase values of the power $P_{BL}$ and phase voltage $V_{BL}$ can be obtained as follows:

$$P_{NL} = \frac{P_{3\emptyset\_NL}}{3} \tag{12}$$

$$V_{NL} = \frac{V_{L\_NL}}{\sqrt{3}} \tag{13}$$

Then, $R_W$ and $X_m$ can be obtained using the following equations:

$$\cos(\emptyset_{NL}) = \frac{P_{NL}}{V_{NL}I_{NL}} \tag{14}$$

$$\sin(\emptyset_{NL}) = \sqrt{1 - \left(\frac{P_{NL}}{V_{NL}I_{NL}}\right)^2} \tag{15}$$

$$I_w = I_{NL}\cos(\emptyset_{NL}) \tag{16}$$

$$I_m = I_{NL}\sin(\emptyset_{NL}) \tag{17}$$

-continued $$X_m = \frac{|\overline{V_{NL}} - \overline{I_{NL}}(R_1 + jX_1)|}{I_m} \quad (18)$$

$$R_w = \frac{|\overline{V_{NL}} - \overline{I_{NL}}(R_1 + jX_1)|^2}{P_{NL} - I_{NL}^2 R_1} \quad (19)$$

Figure 11:
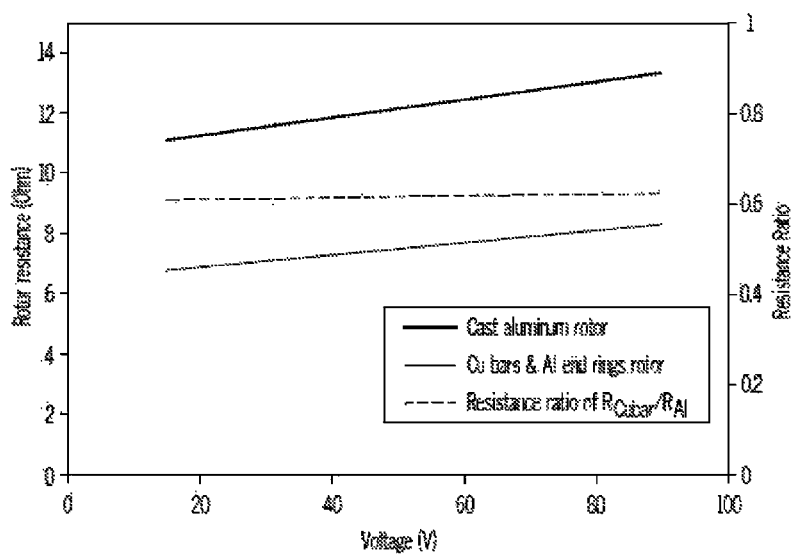
FIG. 11 is a graph showing the estimated rotor resistance and resistance ratio in an electric motor.
Figure 12:
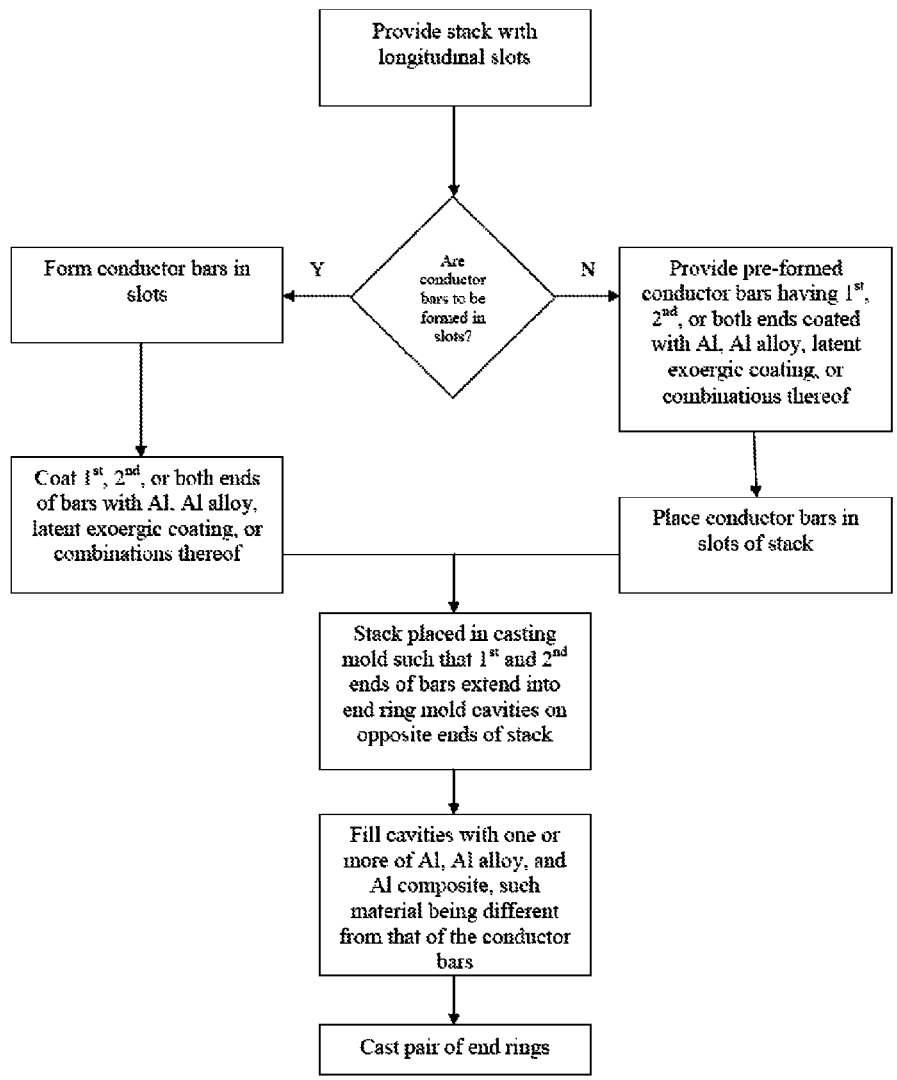

FIG. 11 shows a comparison of the estimated rotor-resistance between the copper-bars/aluminum-rings rotor and the cast aluminum rotor, together with the resistance ratios of the copper-bars/aluminum-rings rotor over the cast aluminum one. FIG. 11 is based on the following assumptions: the motor design (bar dimension and end ring geometry) is identical for both the cast aluminum rotor and the copper-bars/aluminum-rings rotor; the aluminum alloy used in both rotors is 6101-T61 (59% IACS electrical conductivity); the rotor with copper bars has a bar fill-factor of approximately 95%; and the electric motor has a stator resistance (R1) of about 13 Ohm, and the rotor resistance is increased by 3% for every voltage increase in the cast aluminum rotor and 2% for the copper rotor, respectively. As expected, the resistance of the copper-bars/aluminum-rings rotor is lower than that of the cast aluminum rotor. The average rotor resistance ratio is about 0.63 which is close to the expected 59%/95%=0.62.

Light and high conductive cast aluminum rotors can be produced. The cast-in-place copper conductor bars in the aluminum rotor provide much better electric and thermal conductive performance than cast aluminum bars. In addition, copper bars are generally stronger than aluminum bars. Importantly, the hot tearing problem with a cast whole aluminum rotor or a copper rotor is eliminated at the intersections of conductors (bars) and the end rings, and the durability of the electric rotor is thus significantly increased.

The low linear thermal expansion coefficient of the copper bars in the cast-in-place rotors can greatly reduce gap forming in the stacked laminated steel at elevated temperatures, and thus improve the efficiency of the electric motors.

The cast-in-place copper bars can serve as chills during solidification of the end rings and help to reduce porosity in the end rings. This results in further improvement in the thermal and electrical performance and the durability of the electric motors.

The use of preformed or premade conductor bars can also eliminate the potential current short between the laminate steel sheets as typically observed in casting conductor bars. When casting conductor bars in the slots of the laminate steel stack, the liquid metal can be squeezed into the gaps between laminate steel sheets, leading to a current short between the laminate steel sheet and a reduction of electromagnetic performance of the rotor.

Further, it is noted that recitations herein of a component of an embodiment being "configured" in a particular way or to embody a particular property, or function in a particular manner, are structural recitations as opposed to recitations of intended use. More specifically, the references herein to the manner in which a component is "configured" denotes an existing physical condition of the component and, as such, is to be taken as a definite recitation of the structural factors of the component.

It is noted that terms like "generally," "commonly," and "typically," when utilized herein, are not utilized to limit the scope of the claimed embodiments or to imply that certain features are critical, essential, or even important to the structure or function of the claimed embodiments. Rather, these terms are merely intended to identify particular aspects of an embodiment or to emphasize alternative or additional features that may or may not be utilized in a particular embodiment.

For the purposes of describing and defining embodiments herein it is noted that the terms "substantially," "significantly," and "approximately" are utilized herein to represent the inherent degree of uncertainty that may be attributed to any quantitative comparison, value, measurement, or other representation. The terms "substantially," "significantly," and "approximately" are also utilized herein to represent the degree by which a quantitative representation may vary from a stated reference without resulting in a change in the basic function of the subject matter at issue.

Having described embodiments of the present invention in detail, and by reference to specific embodiments thereof, it will be apparent that modifications and variations are possible without departing from the scope of the embodiments defined in the appended claims. More specifically, although some aspects of embodiments of the present invention are identified herein as preferred or particularly advantageous, it is contemplated that the embodiments of the present invention are not necessarily limited to these preferred aspects.

What is claimed is:

1. A method of making a squirrel cage rotor, the method comprising;
   providing a laminated steel stack having a plurality of substantially longitudinal slots formed therein;
   forming a plurality of conductor bars in the plurality of substantially longitudinal slots, each conductor bar being made of a high conductive material and having opposing first and second ends extending beyond the laminate steel stack;
   coating the first ends, or the second ends, or both of the plurality of conductor bars with aluminum, aluminum alloys, a latent exoergic coating, or combinations thereof;
   placing the laminated steel stack with the plurality of conductor bars in a casting mold having cavities for a pair of end rings on opposite ends of the laminated steel stack, wherein the first and second ends of the plurality of conductor bars extend into the cavities; and
   filling the cavities with aluminum, aluminum alloys, aluminum composites, or combinations thereof and casting the pair of end rings;
   wherein the plurality of conductor bars and the end rings are made of different materials.

2. The method of claim 1 wherein the cavities are filled using a casting method selected from high pressure die casting, low pressure die casting, sand casting, squeeze casting, centifugal casting, lost foam casting, investment casting, or combinations thereof.

3. The method of claim 1 further comprising bending the first ends, or the second ends, or both of the plurality of conductor bars before filling the cavities.

4. The method of claim 1 further comprising welding the first ends, or the second ends, or both of the plurality of conductor bars together before filling the cavities.

5. The method of claim 1 wherein the plurality of conductor bars are formed in the longitudinal slots of the laminate steel stack by a casting process or a powder metallurgy process.

6. The method of claim 1 wherein the high conductive material is copper, silver, or alloys thereof; preformed extruded pure aluminum or aluminum alloys; or copper, silver, or aluminum matrix composites containing high conductive particles, fibers, or tubes; or combinations thereof.

7. The method of claim 1 wherein the plurality of conductor bars are not perpendicular to a plane of the end ring where the plurality of conductor bars are attached.

8. A method of making a squirrel cage rotor, the method comprising;
   providing a laminated steel stack having a plurality of substantially longitudinal slots formed therein;
   placing a plurality of preformed conductor bars made of a high conductive material in the longitudinal slots such that first and second ends of the bars extend beyond the laminated steel stack, the first ends, the second ends, or both of the plurality of conductor bars being coated with aluminum, aluminum alloys, a latent exoergic coating, or combinations thereof;
   providing a pair of end rings by placing the laminated steel stack with the plurality of conductor bars in a casting mold having cavities for a pair of end rings on opposite ends of the laminated steel stack, wherein the first and second ends of the plurality of conductor bars extend into the cavities; and filling the cavities with aluminum, aluminum alloys, aluminum composites, or combinations thereof and casting the pair of end rings;
   wherein the plurality of conductor bars and the end rings are made of different materials.

9. The method of claim 8 wherein the high conductive material is copper, silver, or alloys thereof; preformed extruded pure aluminum; or copper, silver, or aluminum matrix composites containing high conductive particles, fibers, or tubes; or combinations thereof.

10. The method of claim 8 wherein the plurality of conductor bars are not perpendicular to a plane of the end ring where the plurality of conductor bars are attached.

11. The method of claim 8 further comprising bending the first ends, or the second ends, or both of the plurality of conductor bars before filling the cavities.

12. The method of claim 8 further comprising welding the first ends, or the second ends, or both of the plurality of conductor bars together before filling the cavities.

13. The method of claim 8 wherein the latent exoergic coating comprises aluminum and at least a conductor bar chemical element selected from copper, aluminum, and silver.

14. The method of claim 1 wherein the latent exoergic coating comprises aluminum and at least a conductor bar chemical element selected from copper, aluminum, and silver.

* * * * *